Jan. 13, 1970

L. DIOLOT 3,489,363

EXPANDABLE MANDREL

Filed July 17, 1967

INVENTOR:
LUCIEN DIOLOT

BY Dicke e Craig
ATTORNEYS

United States Patent Office 3,489,363
Patented Jan. 13, 1970

3,489,363
EXPANDABLE MANDREL
Lucien Diolot, Neuilly-sur-Seine, France, assignor to
Societe Nouvelle Spidem, Paris, France
Filed July 17, 1967, Ser. No. 654,008
Int. Cl. B65h 75/18
U.S. Cl. 242—72.1                                    20 Claims

ABSTRACT OF THE DISCLOSURE

An expandable mandrel including a central rod having a concentric hollow shaft slideable thereon, a concentric hollow hexagonal hub slideably mounted on the shaft, and three external segments alternating with three corner members, each of which are radially opposite a corresponding side of the hexagonal hub. The rod is axially driven by double acting piston-cylinder to axially drive the hub by a pin extending through a slot in the axially fixed hollow shaft. Axial movement of the hub operates radially expandable wedge means to expand and contract the segments, and roller-cam rails to expand and contract the corner members so that the corner members are always in engagement with the segments.

---

The rolling of very long or indefinite length products requires the use of winding and unwinding mandrels. These mandrels undergo large mechanical stresses because the band or indefinite length article is wound with traction or unwound with retention, and because of large thermal stresses if the rolling is hot. Nevertheless, it is still necessary to be able to rapidly and easily remove the reels or bobbins from the mandrels, and it is highly desirable to use volume changing mandrels, that is expandable mandrels. Because of the above mentioned stresses, the friction pieces in expandable mandrels must be carefully lubricated.

However, the prior art expandable mandrels operate by rods, arms, slides or the like and employ locking devices that are difficult to operate in a given position and after a relatively short operating time, the different members become loose and their operation becomes defective. It is equally difficult to find lubricants on the market that will remain effective under the imposed conditions.

It is an object of the present invention to overcome the above mentioned disadvantages by providing a completely reliable and satisfactory expandable mandrel.

The expandable mandrel with the present invention is designed for the winding and unwinding of cold or hot rolled bands and comprises a hollow hub able to slide along the axis of the mandrel. The periphery of this mandrel has sliding pieces in longitudinally aligned grooves and the first rails on which rollers can roll opposite from corresponding ones of the sliding pieces. The displacement by the hub of the sliding pieces in the grooves causes the radial spreading or contraction of the external segments. Second roller rails are interposed between adjacent segments in opposition to the first rails so that the roller can roll between and in contact with the two opposite rails; the second rails radially moving away from or closer to the first rails during the expansion or contraction of the mandrel, respectively. Corner members are carried by the second rails for constant engagement with the segments through cooperating parallel friction plate surfaces.

Further features, objects and advantages of the present invention will become more clear from the following detailed description of an expandable mandrel, according to the present invention, with hydraulic control for actuating the slideably hollow hub, in connection with the accompanying drawing in which.

Figure 1:
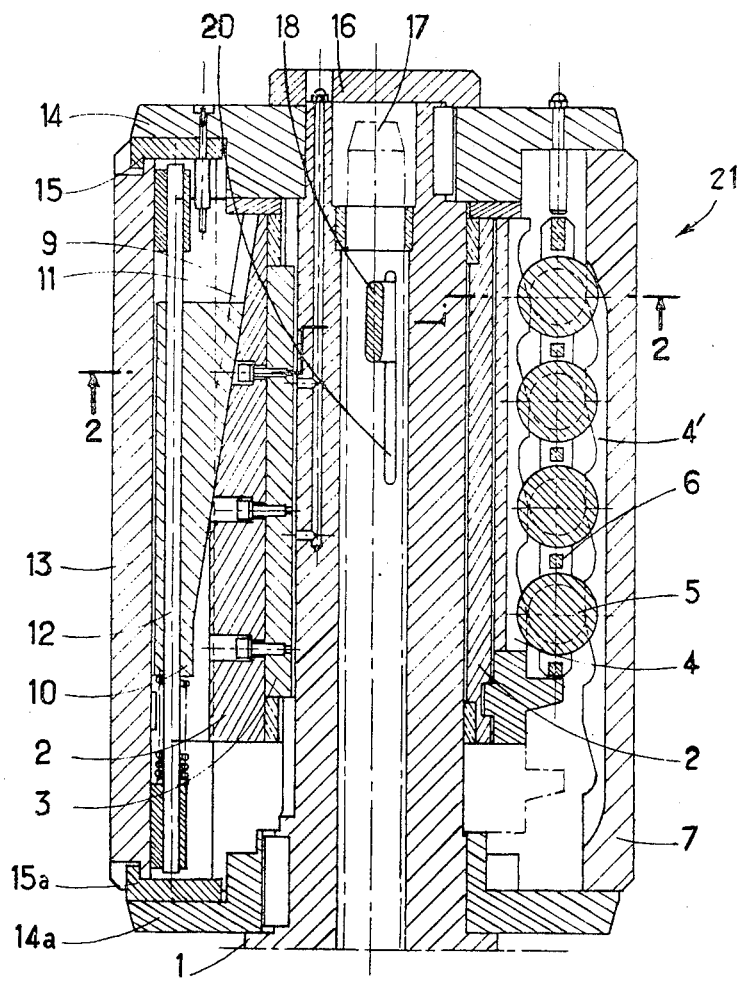
FIGURE 1 is a longitudinal cross sectional view of the mandrel along line B—B of FIGURE 2.
Figure 2:
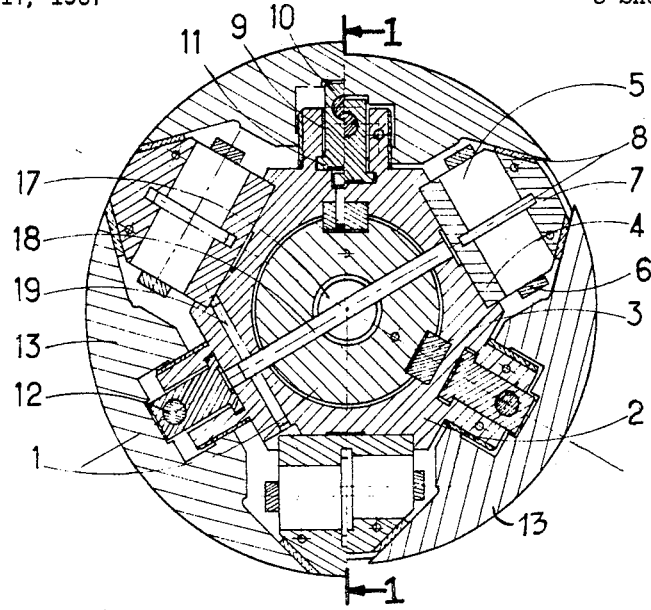
FIGURE 2 is a transverse or radial cross sectional view taken along line A—A of FIGURE 1, with the mandrel being shown in the expanded position for the left hand portion of the figure and in the contracted position for the right hand portion of the figure.

As shown in FIGURES 1 and 2, a hollow cylindrical shaft 1 carries concentrically thereon a hollow hub 2, having a hexagonal exterior shape. The hub 2 is slideably mounted on the hollow shaft 1 by means of guides or keys 3. The treated metal rails 4 are mounted on the hub 2 and are circumferentially spaced from each other at 120°. The treated metal rollers 5 roll on the rails 4 and the rails 4' arranged in opposition to the rails 4, in such a way that the rollers rest on them by two diametrically opposed lines of contact. Each rail has a roller supporting surface with a profile comprising generally axially extending surfaces, that is either axially extending surfaces or very slightly inclined surfaces, and connecting curved surfaces therebetween. Each of the rollers 5 has a median key or central annular flange moving in longitudinal grooves provided on the two rails to serve as a lateral guide maintaining the roller axes perpendicular to the displacement axis of the hub. The rollers are housed in a suitably braced container or roller cage 6. The rails 4' are rigidly connected with corresponding outer corner members 7 that have friction metal plates 8.

The hub's sides that are spaced 120° from each other and 60° from the rolling rails 4 are provided with milled or counter sunk portions or grooves 9 receiving therein T-shaped sliding wedge pieces 10, each having its end piece 11 guided in an inclined groove provided in the bottom of the milled or counter sunk portions 9. The sliding wedge pieces 10 have a bore in the portion opposite from the end piece 11 for receiving therein a cylindrical rod 12 that is fixed at its extremities to the corresponding outer segment 13. This unit is laterally closed by flanges 14 and 14a that oppose each other and are keyed on the shaft 1. The flanges 14 and 14a have radially extending keys 15 and 15a interengaging with the segments 13 to rotatably drive the unit; segments 13 can slide radially and come to rest on the end pieces 15 to prevent any further radial expansion once they have obtained their outer most position.

The above described hub, flanges, segments and corner pieces with their cooperating structure are held axially in position by means of an integral flange 1' on the shaft 1 (on the bottom as shown in FIGURE 1) on one side and by stop plate 16 removably and fixedly mounted on the other end of the shaft 1.

A rod 17, that is the piston rod of a hydraulic jack mounted at the extended end of the shaft 1, slides in the central bore of the shaft 1. On the free extremity of the rod 17, there is mounted a key 18 radially extending through an axially elongated groove 20 in the shaft 1. The outer ends of the key 18 are rigidly attached to the hub 2 by means of a cylindrical cross pin 19. Thus, the rod 17 and the hub 2 are rigidly drivingly connected together.

Figure 3:
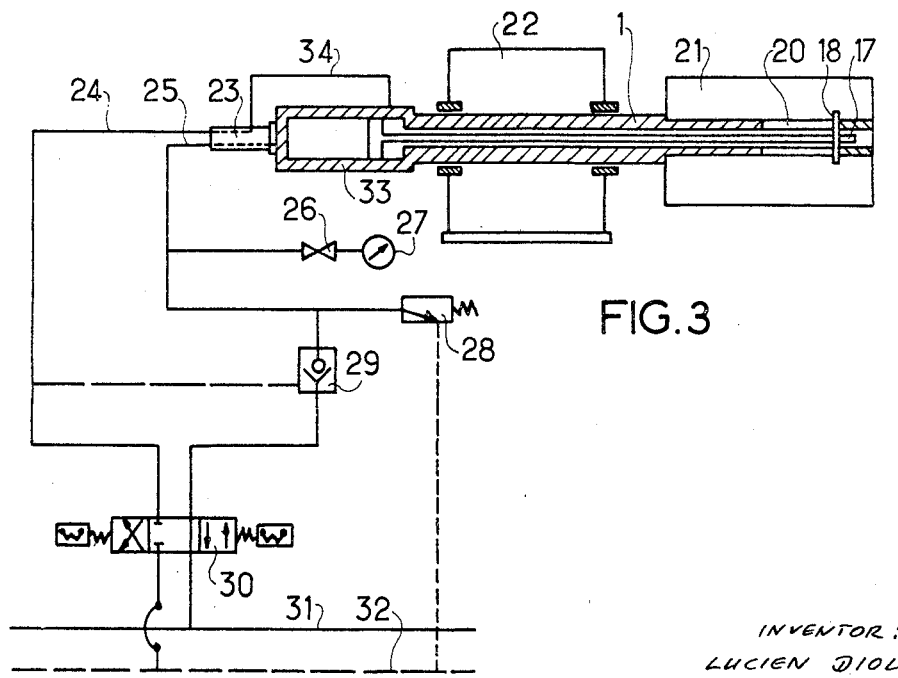
FIGURE 3 is a schematic diagram of the mandrel, the power actuating mechanism and the hydraulic control circuit.

FIGURE 3 represents one possible and preferred environment for the mandrel along with a diagram of the hydraulic control circuit. The mandrel, designated in its entirety by 21, is placed on the hollow shaft 1 that has an extension drivingly passing through a gear speed reduction assembly 22 and ends in the working cylinder of the hydraulic jack 33. At the free end of the hydraulic jack 33, there is provided a rotatable joint or seal 23, which is conventional per se, to connect the exhaust and the intake conduits 24 and 25 to the working cylinder of the jack. The portion of the joint 23 that is directly connected to the intake and exhaust conduits 24 and 25 is relatively stationary, and the jack may turn with the shaft 1 while it remains in communication with the conduit 24 through an auxiliary conduit 34 on one side and the conduit 25 on the other side.

Figure 4:
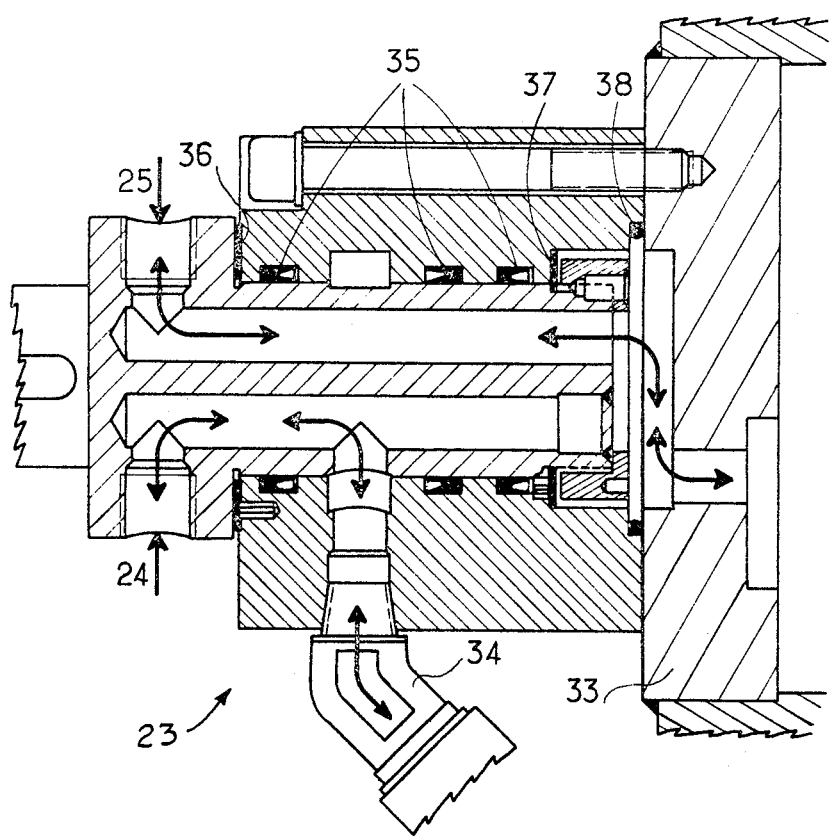
FIGURE 4 is a longitudinal cross sectional view, in detail, of one of the members in FIGURE 3.

Details o fthe joints 23 are shown in FIGURE 4. The turning portion of the joint is coaxial with respect to the fixed portion of the joint and the two are separated by a set of fluid seals 35, 36, 37 and 38.

The conduit 25 is in fluid communication with a stop valve or pressure reduction and calibrating valve 26, to which is operatively attached a contact pressure gauge 27 connected to a luminous or sonorous signal. A discharge valve 28 is operatively connected in the conduit leading from conduit 25 to the fluid reservoir 32. A hydraulically driven check valve 29 is operatively arranged in the conduit 25 and connected to the conduit 24. Conduits 24 and 25 lead from a double electrically operated valve 30 that is operatively connected to the pressurized fluid feed conduit 31 and the reservoir 32.

When the conduit 25 is pressurized, the piston is displaced to the right, to thus drive the hub 2 through the key 18 and rod 17, which causes the rollers 5 to mount or climb the rails 4 and 4', and the sliding pieces 10 to cam the segments outwardly. Thus, the segments 13 and corner members 17 assume their radially outer most position or expanded position, with respect to the axis, which gives the maximum exterior diameter of the mandrel. In this position, the rollers 5 are on the non-slanted or generally axially extending surfaces of the rails 4 and 4', which corresponds to the locked position.

The wedge slopes of the segments in sliding pieces on the one hand and the slopes of the curved portions of the rails for the rollers on the other hand are constructed so that the movements of the segments and corner members are simultaneous and have identical displacement speeds. When the fluid pressure is disconnected by the valve 30, the pressure is retained within the conduit 25 adjacent to the jack 33 by means of the closed check valve 29 and the contact pressure gauge 27 remains under pressure. If a leak exists in the jack circuit, the pressure loss releases the luminous or sonorous signal by operation of the contact pressure gauge.

If the pressurized fluid is supplied to the conduit 24 by means of an appropriate actuation of the valve 30, the piston moves toward the left to similarly drive the hub 2 to the left, as shown in FIGURE 3, which causes the segments and corner members to move toward the axis, that is contract. The mandrel circumference is thus adjusted to its minimum diameter. During this movement, the fluid contained in this chamber on the opposite side of the piston is evacuated by means of the conduit 25, with the check valve 29 being open by the overriding pressure from the conduit 24. To reduce the rather large stresses necessary to start the reduction in size of the mandrel diameter, the rollers can be stopped on the slightly slanted portion of the rails but not on the axially extending portions.

All of the sliding members are provided with insert pieces or plates made of metals having relatively low friction coefficients.

The lubrication of all of these pieces is very easy due to the lubricators judiciously arranged and in all cases it can be abundant. The lubricant is in a closed container and will not become easily contaminated.

During hot rolling, transmission of heat to the inside pieces of the mandrel does not occur easily, because of the line contac tbetween the rollers and rails.

I claim:

1. An expandable mandrel for the winding and unwinding of cold or hot rolled bands and having an axis comprising: a hollow hub slideably mounted along said axis; a plurality of exterior segments and a plurality of corner members, each mounted circumferentially between corresponding ones of said segments; said hub having a plurality of axially extending grooves; said hub having a plurality of wedge means mounted within respective ones of said grooves and engaging said segments for radially expanding and contracting said segments by relative movement of said hub in one and the other axial direction, respectively; said hub having a plurality of first rails, each diametrically opposed with respect to said axis from a corresponding one of said grooves; each of said corner members having a second rail radially opposed to a corresponding one of said first rails; a plurality of rollers mounted between opposed ones of said rails; said rails and rollers defining corner member actuating means for radiallly moving each of said corner members outwardly and inwardly in constant engagement with the corresponding adjacent ones of said segments during the expanding and contracting of said segments, respectively.

2. An expandable mandrel according to claim 1, including a hollow shaft mounted within said hub for relative axial sliding movement and having key means preventing relative rotation and providing axial lost motion.

3. An expandable mandrel according to claim 2, including jack means for axially slideably driving said hub and having a rod mounted within said hollow shaft; said key means axially drivingly interconnecting said rod and said hub, and having a slot within said hollowed shaft and a key slideably mounted within said slot.

4. An expandable mandrel according to claim 1, wherein said hollow hub has a hexagonal radial section, only three wedge means, and only three first rails, with said wedge means and first rails being alternately divided on the six exterior sides of said hexagonal hub.

5. An expandable mandrel according to claim 4, wherein there are only three exterior segments between which are interposed only three corner members.

6. An expandable mandrel according to claim 1, wherein each of said rollers is constantly resting on two opposed rails by diametrically opposed lines of contact, respectively.

7. An expandable mandrel according to claim 1, wherein each rail axially on its roller engaging surface comprises an alternating succession of generally axially extending surfaces and curved connecting surfaces.

8. An expandable mandrel according to claim 1, including cage means for holding said rollers securely in spaced relationship between their respective opposed rails.

9. An expandable mandrel according to claim 1, wherein each of said corner members engages with two adjacent ones of said segments through respective friction metal plates.

10. An expandable mandrel according to claim 1, wherein said corner members have oppositely slanted sides, as viewed in a radial plane, and said segments have sides parallel to their corresponding engaging sides of said corner members.

11. An expandable mandrel according to claim 1, wherein said hub grooves extend in the axial direction and said wedge means include sliding pieces slideably housed in said grooves.

12. An expandable mandrel according to claim 11, wherein each of said grooves includes a slanted groove in its bottom and each sliding piece has a radial section shaped like an inverted T whose cross piece is guided in said slanted groove in the bottom of the corresponding groove.

13. An expandable mandrel according to claim 11, wherein said wedge means includes an outer sliding piece mounted on each of said segments, and a rod extending through the radial outer most portion of each of said outer sliding pieces and secured to the corresponding segment.

14. An expandable mandrel according to claim 1, including two radially extending flanges secured to respective opposite axial ends of said hollow shaft and having interengaging radial key means radially guiding the opposite axial ends of said segments; said hub extending axially between said flanges.

15. An expandable mandrel according to claim 14, wherein said radial key means transmits all of the driving power of the mandrel during the winding or unwinding of bands.

16. An expandable mandrel according to claim 2, wherein said hollow shaft includes an integral flange at one axial end and a stop plate secured at the other axial end for axially retaining said corner members and said segments.

17. An expandable mandrel according to claim 3, where said jack means includes a power cylinder; a gear reduction assembly; said hollow shaft having an axial extension driving extending through said gear reduction assembly and terminating in said power cylinder; said power cylinder having a piston; said rod being drivingly connected to said piston.

18. An expandable mandrel according to claim 3, wherein said jack means is double acting.

19. An expandable mandrel according to claim 3, wherein said jack means is a hydraulic jack.

20. An expandable mandrel according to claim 3, wherein said jack means includes fluid supply and exhaust conduits and rotatable seals fluid connecting said conduits with said power cylinder.

References Cited

UNITED STATES PATENTS

| | | | |
|---|---|---|---|
| 1,527,539 | 2/1925 | Damon | 242—72.1 |
| 2,351,894 | 6/1944 | Allardt | 242—72.1 |
| 2,598,398 | 5/1952 | Littell et al. | 242—72.1 |

NATHAN L. MINTZ, Primary Examiner